(12) United States Patent
Kim et al.

(10) Patent No.: US 9,462,658 B1
(45) Date of Patent: Oct. 4, 2016

(54) LED LIGHTING DEVICE

(71) Applicant: TEKLUX CO., LTD., Seoul (KR)

(72) Inventors: JaeHoon Kim, Incheon (KR); Kiho Nam, Seoul (KR)

(73) Assignee: TEKLUX CO., LTD., Seoul (KR)

( * ) Notice: Subject to any disclaimer, the term of this patent is extended or adjusted under 35 U.S.C. 154(b) by 0 days.

(21) Appl. No.: 14/746,154

(22) Filed: Jun. 22, 2015

(51) Int. Cl.
*H05B 33/08* (2006.01)
*F21K 99/00* (2016.01)

(52) U.S. Cl.
CPC ............... *H05B 33/089* (2013.01); *F21K 9/17* (2013.01); *H05B 33/0809* (2013.01); *H05B 33/0812* (2013.01)

(58) Field of Classification Search
CPC .. H05B 37/02; H05B 33/08; H05B 33/0809; H05B 33/0812; H05B 33/0815; H05B 33/0839; H05B 33/0878

USPC ......... 315/200 R, 209 R, 224–226, 291–297, 315/307, 308, 312
See application file for complete search history.

(56) References Cited

U.S. PATENT DOCUMENTS

2014/0265900 A1* 9/2014 Sadwick ............ H05B 33/0803
315/200 R

* cited by examiner

*Primary Examiner* — Jimmy Vu
(74) *Attorney, Agent, or Firm* — Stein IP, LLC

(57) ABSTRACT

The present invention provides an LED lighting device, which can be directly connected to a socket for a fluorescent lamp without revising the socket to a dedicated LED Light circuit. The LED lighting device may be prevented from being damaged by the overvoltage generated in the stabilizer and introduced into the driving circuit, and this device is reactivated when a normal voltage is introduced. For this purpose, the LED lighting device includes first and second power input units, first and second rectification units, a smoothing unit, an overvoltage protection unit, and a driving voltage generation unit.

2 Claims, 2 Drawing Sheets

LED LIGHTING DEVICE

BACKGROUND OF THE INVENTION

1. Field of the Invention

The present invention relates to an LED lighting device, and more particularly, to an LED lighting device that is capable of being directly connected to a socket for a fluorescent lamp to prevent an electric circuit from being damaged even though an overvoltage of stabilizer is introduced while using power supplied from the stabilizer.

2. Description of the Related Art

A fluorescent lamp is a lighting mechanism using visible light that is generated by sealing a discharging gas in a glass tube having an inner wall coated with a fluorescence material to allow ultraviolet light, which is generated by discharging the discharging gas, to collide with the fluorescence material. The fluorescent lamp requires relatively low power consumption and has a relatively long lifecycle when compared to those of a filament lamp used for an initial lighting mechanism. Thus, the fluorescent lamp is being used as a primary lighting device for a long time. However, the fluorescent lamp has an environmental problem in which mercury is generated when the fluorescent lamp is wasted. Thus, the fluorescent lamp is restrained in use.

Also, since a lighting device using a light emitting diode (LED) is more effective in energy saving than the fluorescent lamp and has a long lifecycle, the lighting device using LED is being spotlighted in recent years.

Although the LED lighting device has various advantages as described above, the fluorescent lamp may not be replaced with the LED lighting device because the LED lighting device does not use a typical socket connected to the fluorescent lamp due to a difference in driving manner between the fluorescent lamp and the LED. That is, the LED lighting device includes a driving circuit converting a commercial AC power applied to the fluorescent lamp to a rated DC power for operating the LED.

To solve these problems, many technologies on the LED lighting device connected to the socket for the fluorescent lamp in a state where the stabilizer is not removed are being suggested.

However, in the LED lighting device connected to the typical socket for the fluorescent lamp, only an electric circuit for simply converting an AC power into a DC power for driving the LED is disclosed.

Thus, the LED lighting device connected to the typical socket for the fluorescent lamp is inadequate in countermeasure with respect to a problem that occurs when an overvoltage generated by momentary discharge in the stabilizer is applied from the socket.

Also, it is suggested that the LED lighting device connected to the socket for the fluorescent lamp, which is disclosed in the related art so as to block the overvoltage, has a structure in which the electric circuit is broken by using a fuse and a varistor when the overvoltage is introduced as a countermeasure with respect to the overvoltage generated from the stabilizer. However, according to this method, since the circuit is in an inoperable state due to the complete cutting of the fuse, the circuit may not operate any more even though a normal voltage is applied later.

SUMMARY OF THE INVENTION

Technical Problem

Exemplary embodiments of the present invention overcome the above disadvantages and other disadvantages not described above. Also, the present invention is not required to overcome the disadvantages described above, and an exemplary embodiment of the present invention may not overcome any of the problems described above.

Accordingly, the present invention provides an LED lighting device that is directly connected to a socket for a fluorescent lamp to prevent a circuit from being damaged when an overvoltage occurs.

The present invention also provides an LED lighting device that is capable of blocking only a flow of current with respect to the overvoltage, before the circuit is damaged to become in an inoperable state, to protect the circuit.

Technical Solution

To solve the above-described problems, an LED lighting device may include: first and second power input units receiving an AC voltage generated in a stabilizer for a fluorescent lamp, the first and second power input units being broken when an overvoltage or overcurrent is introduced; first and second rectification units wave-rectifying an AC power outputted from the first and second power input units; a smoothing unit smoothing a wave-rectification outputted from the first and second rectification units; an overvoltage protection unit blocking a flow of current when a voltage outputted from the smoothing unit is an overvoltage that is equal to or greater than a critical value, the overvoltage protection unit including first and second Zener diodes reversely connected to an output terminal of the smoothing unit and a silicon rectification controller, wherein the silicon rectification controller serves as a switch device which guides a flow of current to a cathode connected to a ground point from an anode connected to an output terminal of the smoothing unit when the first and second Zener diodes are conducted to each other, and current flowing through the second Zener diode is introduced to the gate; and a driving voltage generation unit generating a driving voltage for driving a plurality of diodes on the basis of a DC voltage outputted from the overvoltage protection unit.

The sum of Zener voltages of the first and second Zener diodes may be a DC voltage ranging from about 300 V to about 350 V.

Advantageous Effects

In the LED lighting device according to the present invention, the driving circuit may be prevented from being damaged by the overvoltage generated in the stabilizer and introduced into the driving circuit to maintain the stable operation of the driving circuit.

Also, in the LED lighting device according to the present invention, a flow of the overvoltage is blocked before the fuse is damaged and the overvoltage is discharged to the ground, so that the driving circuit is stopped without damaging the driving circuit.

Accordingly, in the LED lighting device according to the present invention, an operation of the driving circuit is restricted when an unstable overvoltage is introduced and the circuit is reactivated when a normal voltage is introduced.

BRIEF DESCRIPTION OF THE DRAWINGS

These and/or other aspects and advantages of the invention will become apparent and more readily appreciated from the following description of the embodiments, taken in conjunction with the accompanying drawings of which.

Figure 1:
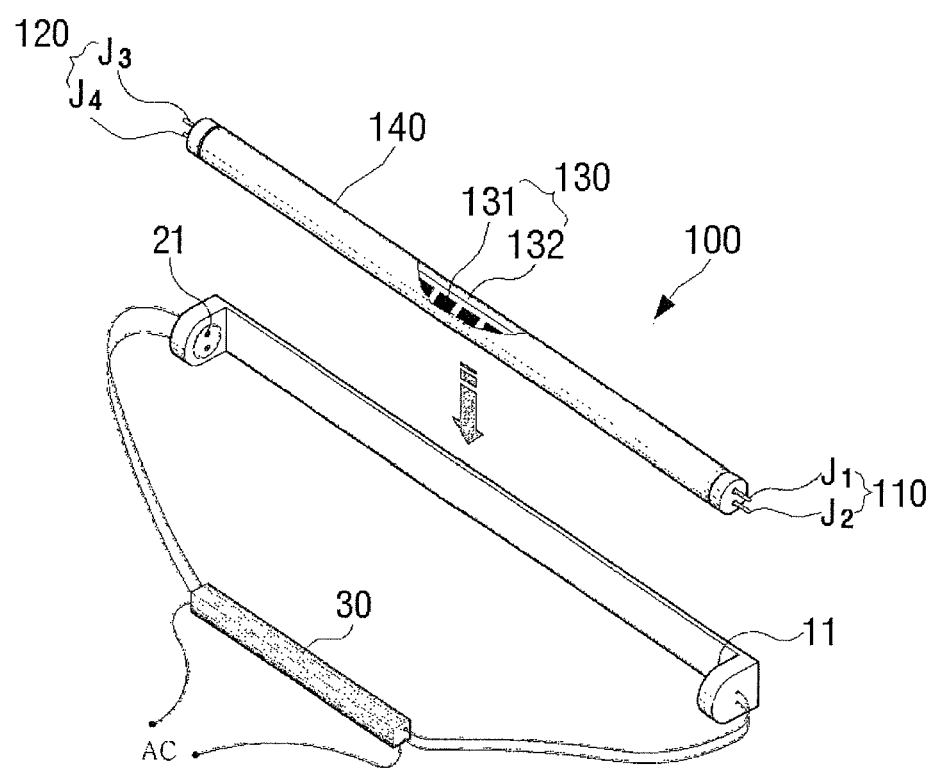
FIG. 1 is a perspective view of an LED lighting device according to the present invention.

DESCRIPTION OF THE REFERENCE SYMBOLS 11, 12: socket for a fluorescence lamp, 30: stabilizer, 100 LED lighting device, 110, 120: first and second input terminals, 130: LED module, 131: LED, 132: printed circuit board, 140: tube

DETAILED DESCRIPTION OF THE EMBODIMENTS

Hereinafter, embodiments of the present invention will be described with reference to the accompanying drawings to realize the above-described objects. Like reference numerals refer to like elements throughout, and an additional description for this is not provided.

FIG. 1 is a view of an LED lighting device using an electronic stabilizer as an LED lighting device according to the present invention. Although the LED lighting device according to the present invention is applied to both an electronic stabilizer and a magnetic stabilizer, the LED lighting device connected to a socket for a fluorescent lamp using the electronic stabilizer illustrated in the drawings will be described in this specification.

Referring to FIG. 1, an LED lighting device 100 according to the present invention includes an LED module 130, a tube 140, first and second input terminals 110 and 120, and a driving circuit (now shown).

The LED module 130 includes an LED 131 and a printed circuit board 132 on which an electric wire providing a driving voltage to the LED 131 is formed.

The tube 140 has a cylindrical shape surrounding the LED module 130 to protect the LED module and diffuses light emitted from the LED 131. The tube may be formed of polycarbonate.

First and second input terminals 110 and 120 are connected to sockets 11 and 21 for a fluorescent lamp to receive a power. Each of the first and second input terminals 110 and 120 has the form of an electrode exposed from a cap surrounding both ends of the tube 140. That is, the first input terminal 110 includes first and second electrodes J1 and J2 connected to the first socket 11, and the second input terminal 120 includes third and fourth electrodes connected to the second socket 21.

The driving circuit converts a high frequency AC power of the stabilizer 30, which is provided through the first and second input terminals 110 and 120, into a rated DC voltage for operating the LED to output the converted voltage. Particularly, when the power generated in the stabilizer 30 is an overvoltage that is equal to or greater than a critical value, the driving circuit may be broken to protect a driving voltage generation unit.

Figure 2:
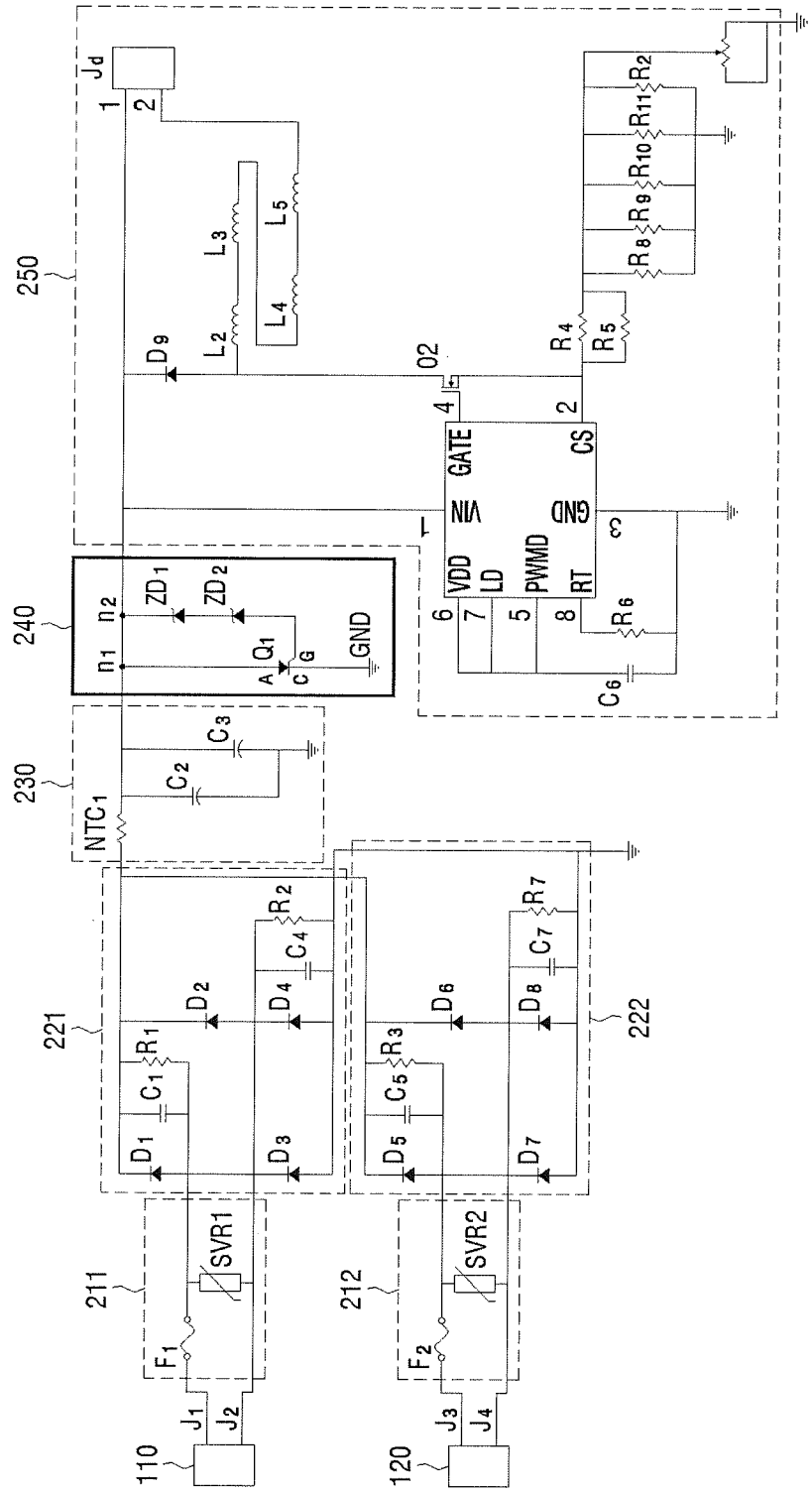
FIG. 2 is a circuit diagram illustrating a driving circuit of the LED lighting device according to the present invention.

As illustrated in the circuit view of FIG. 2, driving circuit includes first and second power input units 211 and 212, first and second rectification units 221 and 222, a smoothing unit 230, an overvoltage protection unit 240, and a driving voltage generation unit 250.

The first power input unit 211 receives an AC power through the first input terminal 110 and includes a first fuse F1 connected in series to the first electrode J1 and a first varistor SVR1 connected in parallel to the first and second electrodes J1 and J2. The first fuse F1 and the first varistor SVR2 breaks a circuit disposed at a rear side thereof when an overvoltage or overcurrent is introduced to protect the circuit.

Similarly, the second power input unit 212 receives an AC power through the second input terminal 120 and includes a second fuse F2 connected in series to the third electrode J3 and a second varistor SVR2 connected in parallel to the third and fourth electrodes J1 and J2.

The first and second rectification units 221 and 222 wave-rectifies an AC power introduced through each of the first and second power input units 211 and 212.

That is, the first and second rectification units 221 and 222 wave-rectify the AC power introduced through the first electrode J1 and the second electrode J2, the third electrode J3 and the fourth electrode J4, the first electrode J1 and the third electrode J3, the first electrode J1 and the fourth electrode J4, the second electrode J2 and the third electrode J3, or the second electrode J2 and the fourth electrode J4.

For this, the first and second rectification units 221 and 222 may be connected to first to fourth diodes D1, D2, D3, and D4 and fifth to eighth diodes D5, D6, D7, and D8 in a bridge shape, respectively. Here, the first to fourth diodes D1, D2, D3, and D4 and the fifth to eighth diodes D5, D6, D7, and D8 may have the same bridge structure with respect to each of the first and second input units 211 and 212.

Also, the first and second rectification units 221 and 222 include first and fourth capacitors C1 and C4 and fifth and seventh capacitors C5 and C7 for removing a noise.

The smoothing unit 230 removes riffle of the AC power that is wave-rectified by the first and second rectification units 221 and 222 to smooth the AC power. For this, the smoothing unit 230 includes a negative temperature coefficient (NTC) thermistor NTC1 connected to an output terminal of the first and second rectification units 221 and 222 and second and third capacitors connected in parallel to the NTC thermistor NTC1.

When a voltage outputted from the smoothing unit 230 is equal to or greater than a critical overvoltage, the overvoltage protection unit 240 prevents the driving voltage generation unit 250 from being damaged by the overvoltage introduced into the driving voltage generation unit 250.

For this, the overvoltage protection unit 240 includes first and second Zener diodes ZD1 and ZD2 reversely connected to an output terminal n1 of the smoothing unit 230 and a switching device Q1.

The switching device Q1 uses a silicon controlled rectifier (hereinafter, refers to as SCR). An anode A of the switching device Q1 is connected to the first node n1 that is an output terminal of the smoothing unit 230 and a cathode C is connected to the ground GND. Also, a gate G of the switching device Q1 is connected to an anode of the second Zener diode ZD2.

The first Zener diode ZD1 includes a cathode reversely connected between the output terminal n1 of the smoothing unit 230 and the input terminal of the driving voltage generation unit 250, and the second Zener diode ZD2 is connected in series to the first Zener diode ZD1. Accordingly, the first and second Zener diodes ZD1 and ZD2 may be conducted to the output terminal n1 of the smoothing unit 230 when a voltage equivalent to the sum of Zener voltages of the first and second Zener diodes ZD1 and ZD2 flows.

Also, the anode of the second Zener diode ZD2 is connected to the gate G of the switching device Q1. That is, when the first and second Zener diodes ZD1 and ZD2 are conducted to each other, a voltage outputted from the second Zener diode functions as an operation voltage of the switching device Q1.

An operation of the overvoltage protection unit 240 constituted by the above-described circuits will be described below.

When a voltage outputted from the smoothing unit 230, which is less than a Zener voltage, is applied, the output terminal of the overvoltage protection unit 240 has the same potential as that of the input terminal to provide the power applied from the input terminal to the driving power generation unit 250. That is, current does not flow through the overvoltage protection unit 240 connected to the output terminal n1 of the smoothing unit 230.

Also, the first and second Zener diodes ZD1 and ZD2 may be conducted to each other when a voltage outputted from the smoothing unit 230 is equal to or greater than the sum of Zener voltages of the first and second Zener diodes ZD1 and ZD2.

Thus, when current is introduced to the gate of the switching device Q1 via the second Zener diode ZD2, the current flows from the anode A to cathode C of the switching device Q1.

That is, while the current flows from the output terminal n1 of the smoothing unit 230 to the ground GND, the current flowing from the smoothing unit 230 to the driving voltage generation unit 250 is blocked.

The above-described circuit may be set so that the first and second Zener diodes ZD1 and ZD2 have the sum of the Zener voltages, which is less than the voltage blocked by the power input unit 211 and 212. For example, each of the first and second Zener diodes ZD1 and zD2 has a Zener voltage of about 150 V. That is, the overvoltage protection unit 240 may be set to break the circuit when the output voltage outputted from the smoothing unit 230 is equal to or greater than about 300V.

The driving voltage generation unit 250 generates a driving voltage for driving a plurality of LEDs from a DC voltage outputted from the overvoltage protection unit 240 to provide the driving voltage to the LED through an LED connection electrode.

The driving circuit generation unit 250 generates a driving voltage corresponding to the sum of a forward voltage that is required by the plurality of LEDs connected in series or parallel to each other. That is, the voltage required for operating the LED may be outputted regardless of the intensity of the voltage and current introduced from the overvoltage protection unit 240. As a result, although voltages provided from the overvoltage protection unit 240 are different from each other, an additional tuning process according to a required voltage of the LED lighting device is not required because the voltage outputted from the LED connection electrode Jd is uniform.

For this operation, the driving voltage generation unit 250 may use a DC-DC converter using a pulse width modulation (PWM) control method as illustrated in the drawings. Alternatively, the driving voltage generation unit 250 may use a pulse frequency modulation control method (PFM) changing a period of a clock having a fixed pulse width to maintain the output voltage or a variable frequency modulation control method controlling a clock outputted with a fixed pulse according to an output voltage error to maintain the output voltage.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An LED lighting device, comprising:
   first and second power input units receiving an AC voltage generated in a stabilizer for a fluorescent lamp, the first and second power input units being broken when an overvoltage or overcurrent is introduced;
   first and second rectification units wave-rectifying an AC power outputted from the first and second power input units;
   a smoothing unit smoothing a wave-rectification outputted from the first and second rectification units;
   an overvoltage protection unit blocking a flow of current when a voltage outputted from the smoothing unit is an overvoltage that is equal to or greater than a critical value, the overvoltage protection unit comprising first and second Zener diodes reversely connected to an output terminal of the smoothing unit and a silicon rectification controller, wherein the silicon rectification controller serves as a switch device which guides a flow of current to a cathode connected to a ground point from an anode connected to an output terminal of the smoothing unit when the first and second Zener diodes are conducted to each other, and current flowing through the second Zener diode is introduced to the gate; and
   a driving voltage generation unit generating a driving voltage for driving a plurality of diodes on the basis of a DC voltage outputted from the overvoltage protection unit.

2. The LED lighting device of claim 1, wherein the sum of Zener voltages of the first and second Zener diodes is a DC voltage ranging from about 300 V to about 350 V.3.

* * * * *